(12) United States Patent
Candelore et al.

(10) Patent No.: US 8,320,563 B2
(45) Date of Patent: Nov. 27, 2012

(54) SERVICE CARD ADAPTER

(75) Inventors: Brant L. Candelore, San Diego, CA (US); Stephane Lejeune, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1032 days.

(21) Appl. No.: 12/077,109

(22) Filed: Mar. 17, 2008

(65) Prior Publication Data

US 2008/0279375 A1     Nov. 13, 2008

Related U.S. Application Data

(60) Provisional application No. 60/928,607, filed on May 9, 2007, provisional application No. 60/993,415, filed on Sep. 11, 2007.

(51) Int. Cl.
*H04L 29/06* (2006.01)
(52) U.S. Cl. .......................................... 380/201; 725/31
(58) Field of Classification Search .................. 380/201; 725/31
See application file for complete search history.

(56) References Cited

U.S. PATENT DOCUMENTS

| | | | | |
|---|---|---|---|---|
| 6,040,851 A * | 3/2000 | Cheng et al. | | 725/132 |
| 6,591,419 B2 * | 7/2003 | Barry et al. | | 725/25 |
| 7,250,987 B2 * | 7/2007 | Goyal et al. | | 348/725 |
| 7,610,427 B2 * | 10/2009 | Nakamura et al. | | 710/301 |
| 7,649,949 B2 * | 1/2010 | Williams et al. | | 375/259 |
| 7,839,998 B2 * | 11/2010 | Candelore et al. | | 380/28 |
| 2002/0008779 A1 | 1/2002 | Ju et al. | | |
| 2002/0101991 A1 * | 8/2002 | Bacon et al. | | 380/212 |
| 2003/0030720 A1 * | 2/2003 | Hutchings | | 348/14.02 |
| 2003/0135730 A1 * | 7/2003 | Szucs et al. | | 713/153 |
| 2004/0117817 A1 * | 6/2004 | Kwon et al. | | 725/31 |
| 2004/0228175 A1 | 11/2004 | Candelore et al. | | |
| 2005/0081245 A1 * | 4/2005 | Arad et al. | | 725/100 |
| 2005/0086694 A1 * | 4/2005 | Hicks et al. | | 725/79 |
| 2005/0147247 A1 * | 7/2005 | Westberg et al. | | 380/200 |
| 2005/0177845 A1 | 8/2005 | Patariu et al. | | |
| 2005/0177860 A1 * | 8/2005 | Goyal et al. | | 725/118 |

(Continued)

FOREIGN PATENT DOCUMENTS

EP     1662361 A1 *   5/2006

OTHER PUBLICATIONS

International Search Report, PCT/US08/62734, Dated Aug. 7, 2008.

(Continued)

*Primary Examiner* — Michael Pyzocha
(74) *Attorney, Agent, or Firm* — Miller Patent Services; Jerry A. Miller

(57) ABSTRACT

An interface adapter device consistent with certain embodiments has a first electrical connector adapted to connect to a conditional access service card to receive encrypted television signals therefrom. A second electrical connector is adapted to connect to a television receiver device in order to provide the encrypted television signals to the television receiver device. An interface circuit receives the encrypted television signals from the first electrical connector and adapts the signals for transmission to a television receiver device over the second electrical connector. This abstract is not to be considered limiting, since other embodiments may deviate from the features described in this abstract.

35 Claims, 4 Drawing Sheets

U.S. PATENT DOCUMENTS

| | | | |
|---|---|---|---|
| 2005/0265084 A1* | 12/2005 | Choi | 365/189.04 |
| 2006/0013556 A1* | 1/2006 | Poslinski | 386/46 |
| 2006/0031676 A1 | 2/2006 | Vantalon et al. | |
| 2006/0090181 A1* | 4/2006 | Oh | 725/39 |
| 2006/0174298 A1* | 8/2006 | Chen et al. | 725/100 |
| 2006/0271654 A1 | 11/2006 | Lee et al. | |
| 2007/0022453 A1* | 1/2007 | Cha | 725/100 |
| 2007/0022458 A1* | 1/2007 | Son | 725/112 |
| 2007/0028260 A1* | 2/2007 | Williams et al. | 725/31 |
| 2007/0124790 A1* | 5/2007 | Hwang et al. | 725/131 |
| 2007/0146542 A1 | 6/2007 | Strasser | |
| 2007/0154173 A1* | 7/2007 | Kim et al. | 386/83 |
| 2007/0250872 A1* | 10/2007 | Dua | 725/81 |
| 2008/0127277 A1* | 5/2008 | Kuschak | 725/74 |

OTHER PUBLICATIONS eHomeUpgrade, "Niveus Media Intros Dual CableCARD Digital Receiver Box for Their Vista PC Lineup," Jan. 2005.

Eric Bangeman, "ATI Brings CableCARD to the PC with Digital Cable Tuner," Jan. 9, 2007.

* cited by examiner

SERVICE CARD ADAPTER

CROSS REFERENCE TO RELATED DOCUMENTS

This application is related to and claims priority benefit of U.S. Provisional Patent Application No. 60/928,607 filed May 9, 2007 and U.S. Provisional Patent Application No. 60/993,415 filed Sep. 11, 2007, both of which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The Cable Television Laboratories, Inc. (CableLabs) specification for a Point Of Deployment (POD) module, otherwise known as a CableCARD™, is being adopted for conditional access and other functions in digital television receiver devise (e.g., television sets and set top boxes (STB)). However, use of such modules have not been universally adopted. The components used to provide the functionality for adaptation to use with a CableCARD™ (or more generically, a service card) adds substantial cost to a television chassis. Such service cards are generally used to permit a television receiver device such as a set top box or television to receive television programming that is protected using a conditional access system, but could also be construed to provide access under any encryption scheme or digital rights management scenario. Since it may be circuitry that is never used in many environments, adding the functionality speculatively increases the cost of a television receiver device unnecessarily in certain cases.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
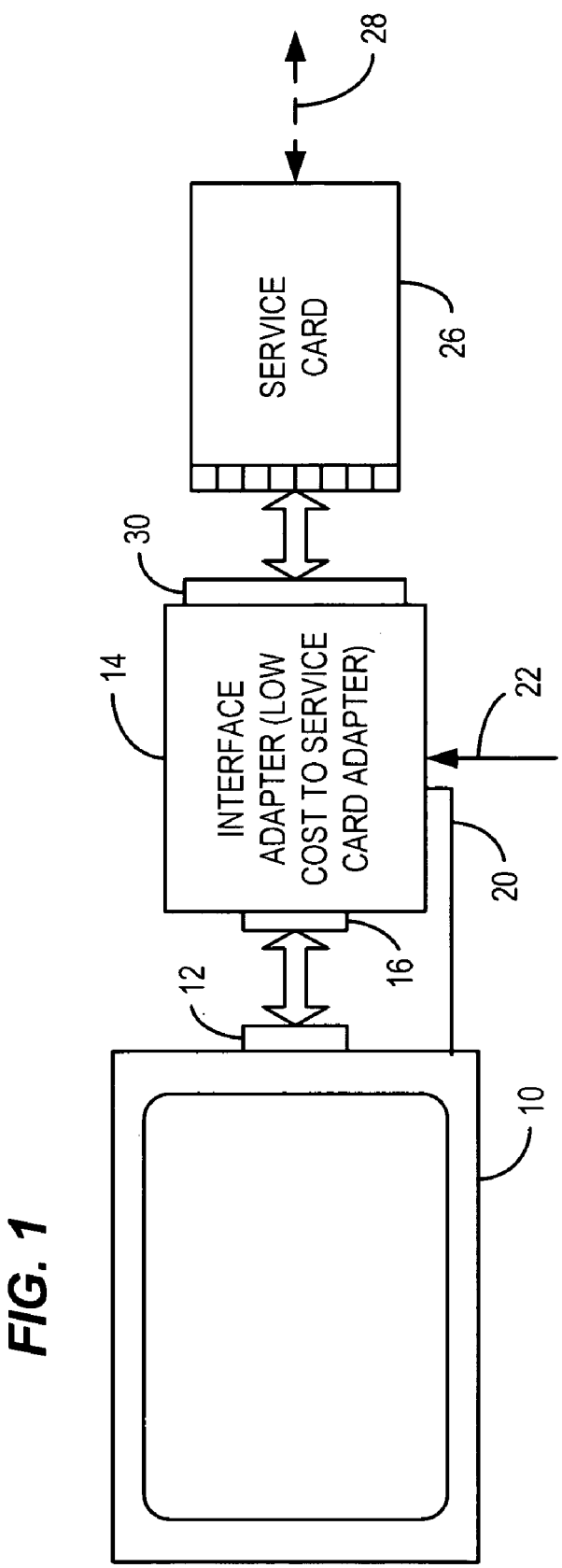
FIG. 1 is a block diagram of a service card adapter arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

CableCARD™ allows the TV to decode the cable signal and eliminate the need for a separate set-top box. This is desirable in typically cramped situations such as kitchens. But the cost of supporting CableCARD™ compatibility speculatively in a TV, when few customers actually use it, burdens all users without regard for their need for that capability. Such costs include the cost of connectors, switching, tuning, buffering and heat sinking, and can add substantially to the manufacturing cost of a TV. In most CableCARD™ compatible implementations the CableCARD™ is provided by the service provider, e.g. cable operator. The cable operator can supply set-top boxes. And often, this scenario is preferred by the home viewer as the set-top box is maintained by the service provider and can bring functionality as Personal Video Recorder (PVR), Video-on-Demand (VOD), switched digital video, and the ability to tune new codecs such as MPEG4, DIVX or FLASH. In the situation where the home viewer uses a service operator supplied set-top box, the TV can be operated as a "dumb display"—connected to the set-top box through connections such as HDMI, DVI, or baseband video and audio.

In accord with embodiments consistent with the present invention, it has been noted that by careful analysis of the CableCARD™ specification, the specification can be adhered to without violation of compliance and robustness rules in a circuit arrangement in which the expensive components are located in a USB version 2.0 (USB2) compatible adapter module (such components including an Out-of-band Tuner and demodulator for example) available for separate manufacture and purchase. The in-band stream can be sent and received to and from the CableCARD™ over USB2. DFAST (Dynamic Feedback Arrangement Scrambling Technique) processing of the copy protected stream is handled by the TV receiver device to avoid conflict with standard DFAST licensing agreements. The USB2 connector is provided on the TV receiver device and can be used to send the in-band stream to and from a CableCARD™ managed by the CableCARD™ adapter module. Conversely, the more expensive functionality of the CableCARD™ adapter module is provided in a USB2 compatible card that can be plugged into the TV receiver device.

Hence, briefly, certain embodiments consistent with the invention relate to a service card such as a CableCARD™ adapter module for supporting CableCARD™ in a television. The CableCARD™ adapter module includes expensive components such as an Out-of-band tuner and an Out-of-band demodulator that are required to support a CableCARD™ in a television. Use of certain embodiments of the invention reduces the cost of supporting the CableCARD™ in the television set itself by migrating the expensive component from the television to the CableCARD™ adapter module. The CableCARD™ is connected to the CableCARD™ adapter module via a CableCARD™ interface and the CableCARD™ adapter module is connected to the television via the USB2 interface, or any other suitable generic, specialized or custom interface. It is noted that the terms service card and CableCARD™ may be used interchangeably herein, which the CableCARD™ serving as an example of a service card.

Turning now to FIG. 1, a high level illustration of an embodiment consistent with the present invention is depicted. In this illustration, a television set 10 is provided with a low cost interface 12 such as a Universal Serial Bus (USB) interface (e.g., version 2.0) and associated connector. An interface adapter 14 is provided with a similar connector 16 which can either be directly plugged into the television 10 or connected via an inexpensive cable. Since such interfaces are produced in extremely large numbers, the cost of implementation is extremely low compared to that of providing an interface to a Service Card directly in the television set. As a result, the cost of implementation in the television set is substantially reduced, which is advantageous since only a comparatively small number of television service customers actually require use of a Service Card.

In this example, the interface card 14 is provided with connector 16 and associated interface circuitry, and may also be provided with other interfaces (e.g., for receipt and processing of RF signals such as at 20 and 22. The interface adapter then provides for connection to a service card 26 by way of a suitable PCMCIA connector 30 as called out in the CableCARD™ specification. The service card may or may not have a separate connector for receipt of data or content (e.g., an Ethernet connection 28 for receipt of IPTV content).

Hence, rather than having each consumer of a television set absorb the cost of the circuitry necessary for interfacing the CableCARD™ directly to the television set, the cost can be offset by use of a less expensive commodity interface that can externally be converted to a suitable CableCARD™ interface, with the associated cost absorbed only by those in need of the CableCARD™ interface. In fact, the TV manufacturer could subsidize the cost of the circuitry and still claim that the TV is "CableCARD™ capable".

Figure 2:
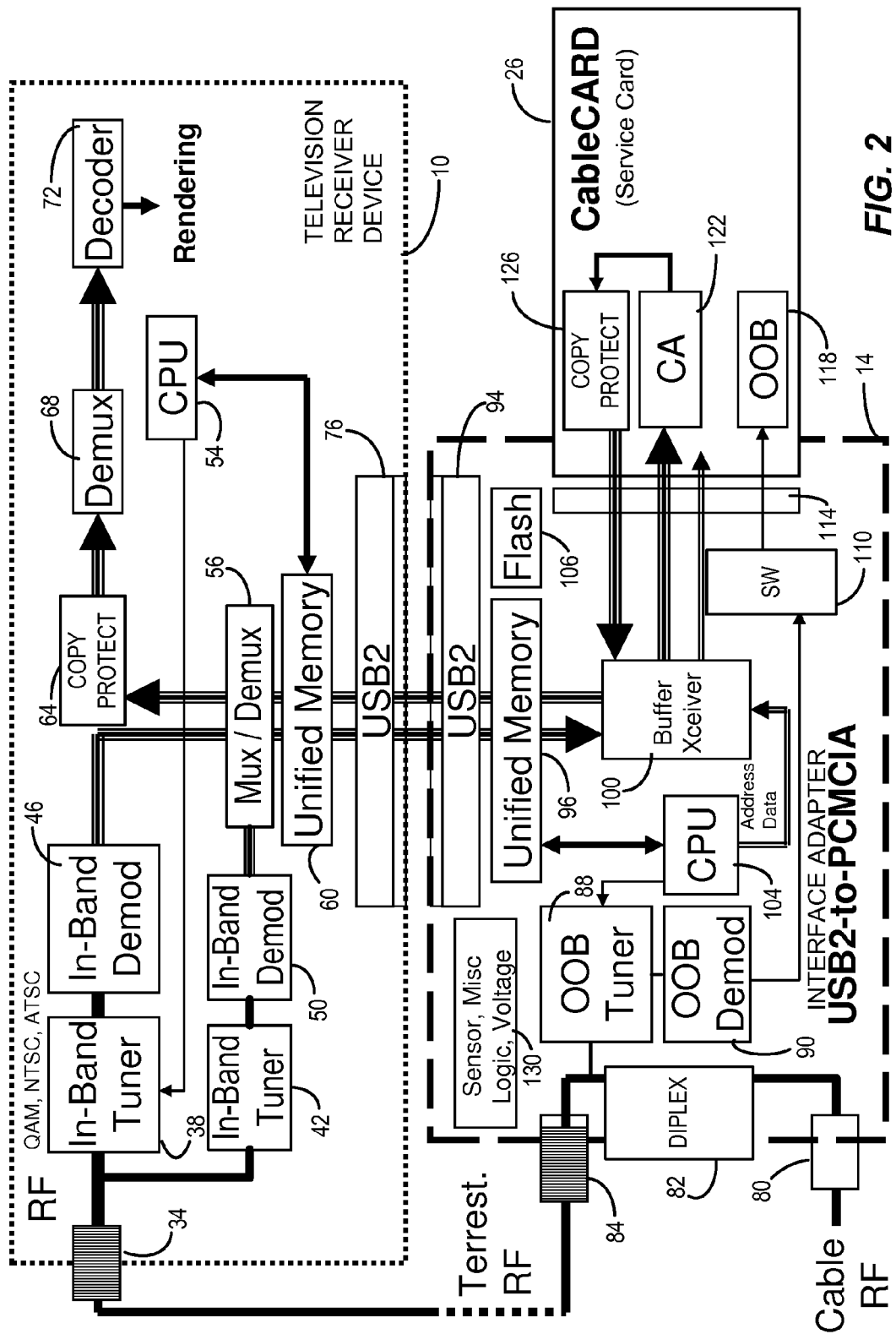
FIG. 2 is a more detailed block diagram of a service card adapter arrangement using a USB connector consistent with certain embodiments of the present invention.

The following FIGURES depict several illustrative examples of CableCARD™ interface circuits consistent with the present embodiment, starting with FIG. 2. In FIG. 2, the Television set or other television receiver device (e.g., television set top box (STB) or set back box (SBB)) 10 of FIG. 1 is depicted. When a CableCARD™ is not in use, the RF signal is received at the RF connector 34. In this case, the television receiver device 10 has two television receivers depicted by a pair of in-band tuners 38 and 42 that receive the RF signal from connector 34, and respectively demodulate the tuned RF signals using in-band demodulators 46 and 50 respectively under control of an internal processor CPU 54. The demodulated signals from 46 and 50, are respectively supplied to a multiplexer/demultiplexer 56 and stored in a unified memory 60. The stored demodulated signals can be retrieved and passed through copy protection circuitry 64 (generally without processing if there is no service card being used), demultiplexed by demultiplexer 68 and decoded at 72 to produce a signal that can be further processed for rendering as a television display signal in any suitable manner. When a service card is being used, the copy protection circuit 64 provides descrambling (decrypting), for example in accord with Dynamic Feedback Arrangement Scrambling Technique (DFAST) requirements. It is possible for other applications beyond cable television, that a different copy protection scheme may be used. A possible alternative is Digital Transmission Copy Protection (DTCP).

In order to provide the functionality of a known CableCARD™ or other service card, the unified memory 60 can be accessed by a USB 2.0 interface and connector 76 (or other low cost interface connection) for passing information between the television receiver device and the interface adapter card 14 and ultimately the service card. While a USB 2.0 interface is depicted for illustrative purposes, many other suitable interfaces such as an IEEE 1394 interface, other standard or customized interface can be used.

In the embodiment depicted, the interface card receives RF signal (e.g., from a cable television service) at connector 80, and using diplexer 82, separates the in-band television signals from the out-of-band signaling used for other purposes and passes the RF television signal on to the television device receiver 30's connector 34 via a suitable secondary cable connection. Hence, the interface adapter device 14 carries an out of band tuner 88 and out of band demodulator 90 that would normally be incorporated into the television receiver device, but need not be in accord with the present embodiment. The interface adapter device 14 is plugged directly or via a connecting cable to the USB connector 76 at its own USB connector and interface 94 to permit data to flow from the television receiver device 30's unified memory 60 to the interface adapter 14's unified memory 96, and vice versa for data flow from the interface adapter 14. Data can similarly be passed to a buffer transceiver 100 to and from unified memory under control of CPU 104, which also controls operation of the out of band tuner 88. CPU 104 operates under control of instructions stored in flash memory 106. Thus, the CPU 104 can also control the path of the demodulated signal from unified memory 96 and buffer transceiver 100 when in use. The interface adapter circuit can also incorporate additional mass storage memory (not shown) that may be accessed and used by the TV receiving device.

Data from the out of band demodulator 90 can be passed to the service card 26 via a switch circuit 110 used to configure the pinout of the PCMCIA connector 114 used to connect to the service card 26, so that out of band data can be processed by appropriate out of band processing circuitry 118 of the service card 26. Data exchanged via unified memory 60 and 96 through buffer transceiver 100 can be processed for conditional access (CA) processing by CA processor 122 and then encrypted by copy protection circuit 126, for example using DFAST encryption, for decryption by copy protection circuit 64 in order to prevent digital content from being exposed in the clear.

The USB2 interface supplies 5 volts. Interface adapter 14 also may include voltage regulation 130 to convert the 5 volts to other necessary voltages needed to power the interface adapter and the CableCARD 26. It is possible that additional power may be required beyond that which may be provided by the USB interface, and a "power brick" or other external power source (not shown) may be used. In addition, sensor and misc. logic circuitry shown as 130 may be present to detect the insertion of the card into the adapter and determine whether it is a CableCARD or other PCMCIA card. It possible that the adapter could also provide the additional memory, e.g. RAM and Flash memory, to store Electronic Program Guide (EPG) tables. When the TV is tuning and decoding the input signal (e.g., from a cable television source), there may be an increase in memory requirements since the EPG tables are stored by the TV itself and not a set-top box, in the embodiments shown.

Hence, in the embodiment depicted, expensive circuitry including the PCMCIA interface has been shifted from the television device receiver to an interface card, reducing the cost of the television receiver device for those customers not requiring such functionality. While the cost of the interface adapter 14 plus the television receiver device may be increased, this cost is only born by those in need of a service card.

Figure 3:
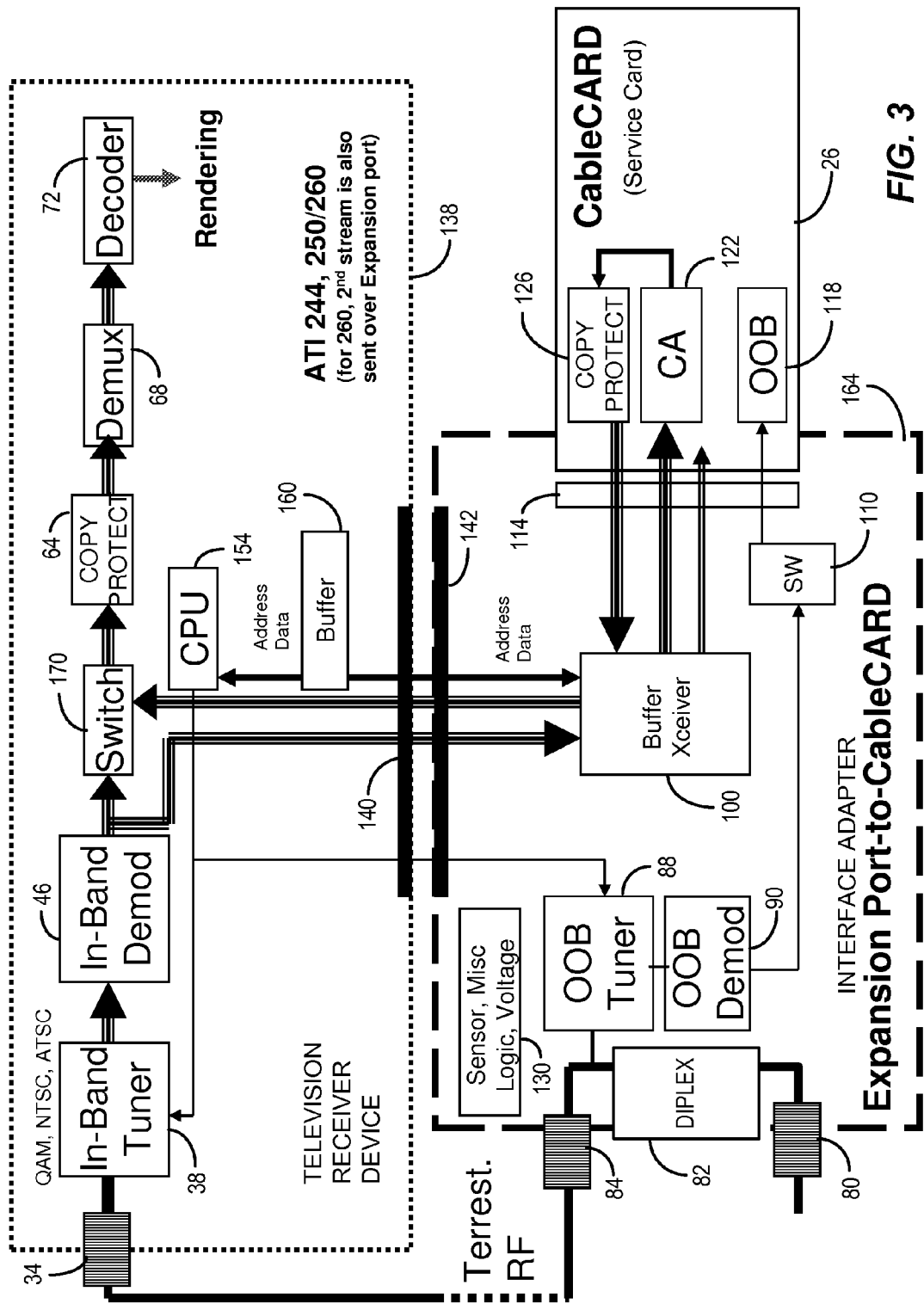
FIG. 3 is a more detailed block diagram of a service card adapter arrangement using a custom connector or bus interface connector consistent with certain embodiments of the present invention.

In another embodiment depicted in FIG. 3, the interface between a television receiver device 138 and an interface adapter card 114 is depicted as having a custom connector 140 or a computer expansion port connection such as custom interface, PCI, PCI express or IDE connection which mates with a mating connector 142 on the interface adapter 164. Interface adapter 164 in this example has a similar secondary connection using RF cables and connectors to the cable system or the like through diplexer 82 to the television receiver device. The PCMCIA connection 114 is similarly provided to a service card 26 functioning in the same manner as described previously. In this example, however, CPU 154 of the television receiver device 138 is coupled through buffers 160 directly to buffer transceiver 100 without need for the unified memory in the pathway. Thus, the CPU 154 controls the flow of demodulated data to and from the interface adapter card 164 and thus, to service card 26, but also provides control to a switch 170 that establishes whether the service card 26 is in the signal path or not based upon need.

Figure 4:
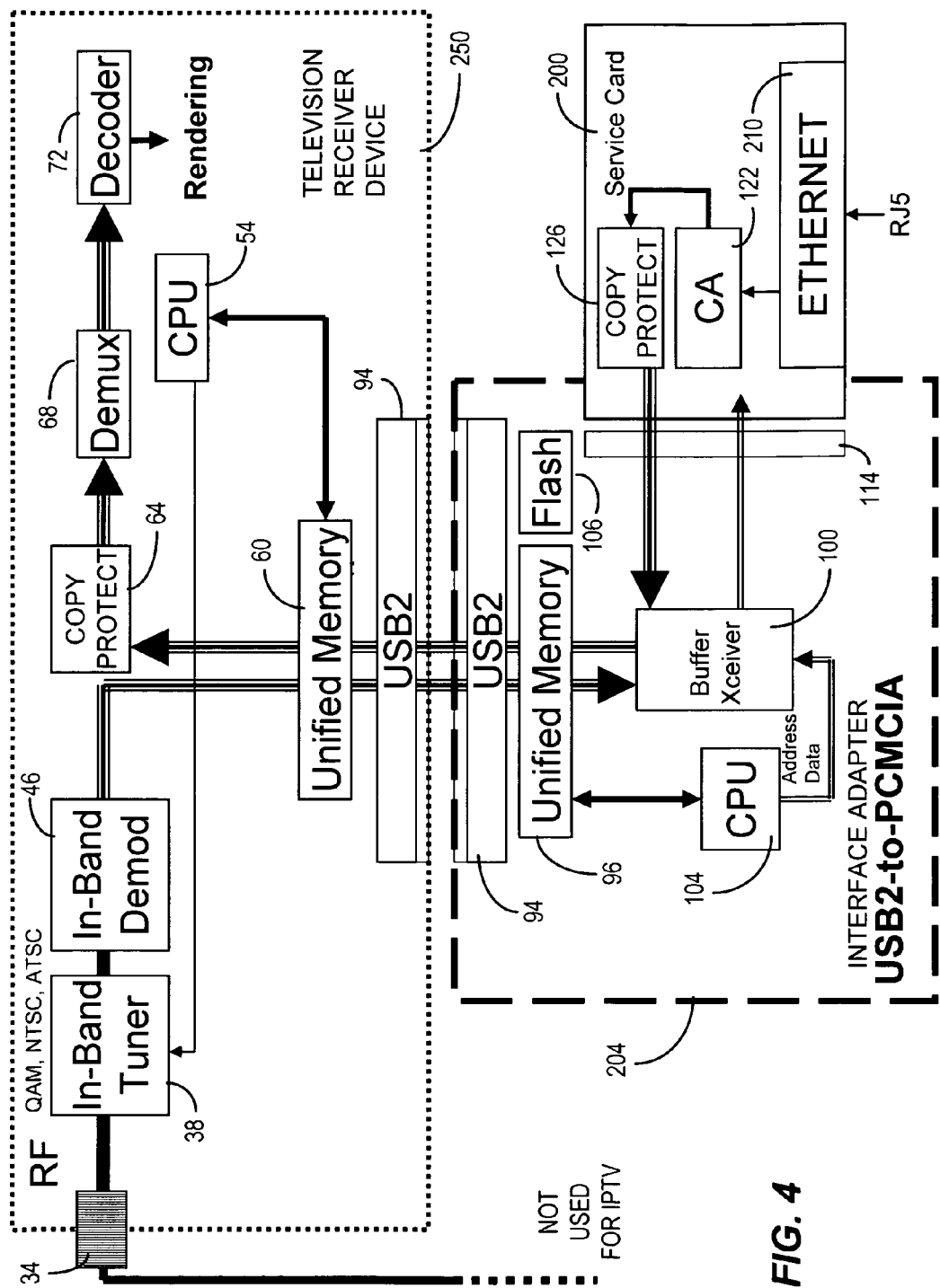
FIG. 4 is a more detailed block diagram of another service card adapter arrangement using a USB connector consistent with certain embodiments of the present invention.

Many other examples are possible without departing from the present invention, and one such example is provided in FIG. 4. In this example, the interface adapter 204 is used to couple content received as data via the service card 200 (e.g., for Internet TV) through an Ethernet adapter 210 (or other network adapter circuit) and passes the content through the PCMCIA connector 114 to buffer transceiver 100. In this example, the CPU 104, and otherwise operates in a manner similar to that of the apparatus of FIG. 2, except that the in-band tuner 38 and in-band demodulator 46 may not be used in the mode where content is coming in directly from the service card 200. In other modes, content can be received unaffected by the service card 200 and received normally through connector 34 for rendering by television receiver device 250.

In certain embodiments, the interface adapter is factory installed in the digital television receiver device, while in other embodiments; the interface adapter is user installable in the digital television receiver device (meaning the interface adapter connects with connectors or other mechanisms that are readily accessible and without need for soldering or elaborate tools such that a user can readily accomplish the installation; e.g., by plugging in). In certain embodiments, the television receiver device may be provided with or without a service card connected to the electrical connector. Many other embodiments are possible and are disclosed by incorporation by reference to the above-referenced provisional patent applications. But, in each case, an interface adapter is used to adapt a service card.

Thus, an interface adapter device consistent with certain embodiments has a first electrical connector adapted to connect to a conditional access service card to receive encrypted television signals therefrom. A second electrical connector is adapted to connect to a television receiver device in order to provide the encrypted television signals to the television receiver device. An interface circuit receives the encrypted television signals from the first electrical connector and adapts the signals for transmission to a television receiver device over the second electrical connector.

In certain embodiments, the encrypted television signals are encrypted using one of DFAST and DTCP encryption. In certain embodiments, the adapter device has an input for receiving an out of band signal; an out of band tuner for tuning the out of band signal; an out of band demodulator that converts the out of band signal to a digital out of band signal; and the digital out of band signal is passed through the first electrical connector to the service card. In certain embodiments, the first electrical connector comprises a PCMCIA connector and wherein the second electrical connector comprises a USB connector. In certain embodiments, the first electrical connector comprises a PCMCIA connector and wherein the second electrical connector comprises a computer bus connector. In certain embodiments, the first electrical connector comprises a PCMCIA connector and wherein the second electrical connector comprises a custom connector In certain embodiments, the interface circuit comprises a USB interface circuit. In certain embodiments, the interface circuit comprises a buffer transceiver communicating with the service card, and further comprises a unified memory in communication with the buffer transceiver, whereby the encrypted television signals can be stored on the unified memory for retrieval by the television receiver device. In certain embodiments, the interface circuit comprises additional mass storage memory that may be used by the TV receiving device. In certain embodiments, the buffer transceiver and the unified memory operate under control of a programmed processor. In certain embodiments, the unified memory further stores television signals received from the television receiver device. In certain embodiments, the interface circuit comprises a buffer transceiver operating under control of a programmed processor residing within the television receiver device.

In certain embodiments, an interface adapter device has a first electrical connector adapted to connect to a conditional access service card to receive encrypted television signals therefrom and a second electrical connector adapted to connect to a television receiver device in order to provide the encrypted television signals to the television receiver device. An interface circuit receives the encrypted television signals from the first electrical connector and adapts the signals for transmission to a television receiver device over the second electrical connector, wherein the interface circuit has a buffer transceiver communicating with the service card, and further has a unified memory in communication with the buffer transceiver, whereby the encrypted television signals can be stored on the unified memory for retrieval by the television receiver device. A programmed processor is provided, wherein the buffer transceiver and the unified memory operate under control of the programmed processor.

In certain embodiments, the encrypted television signals are encrypted using one of DFAST and DTCP encryption. In certain embodiments, the interface adapter has an input for receiving an out of band signal; an out of band tuner for tuning the out of band signal; an out of band demodulator that converts the out of band signal to a digital out of band signal; and the digital out of band signal is passed through the first electrical connector to the service card. In certain embodiments, the first electrical connector comprises a PCMCIA connector and wherein the second electrical connector comprises a USB connector. In certain embodiments, the first electrical connector comprises a PCMCIA connector and wherein the second electrical connector comprises a computer bus connector In certain embodiments, the first electrical connector comprises a PCMCIA connector and wherein the second electrical connector comprises a custom connector. In certain embodiments, the interface circuit comprises a USB interface circuit. In certain embodiments, the unified memory further stores television signals received from the television receiver device.

An interface adapter device consistent with certain embodiments has a first electrical connector comprising a PCMCIA connector adapted to connect to a conditional access service card to receive encrypted television signals therefrom, wherein the encrypted television signals are copy protected; and a second electrical connector such as a USB connector adapted to connect to a television receiver device in order to provide the encrypted television signals to the television receiver device. An interface circuit receives the encrypted television signals from the first electrical connector and adapts the signals for transmission to a television receiver device over the second electrical connector, wherein the interface circuit has a buffer transceiver communicating with the service card, and further has a unified memory in communication with the buffer transceiver, whereby the encrypted television signals can be stored on the unified memory for retrieval by the television receiver device. A programmed processor is provided wherein the buffer transceiver and the unified memory operate under control of the programmed processor. An input receives an out of band signal and an out of band tuner tunes the out of band signal. An out of band demodulator converts the out of band signal to a digital out of band signal. Wherein the digital out of band signal is passed through the first electrical connector to the service card. In certain embodiments, the unified memory further stores television signals received from the television receiver device.

In certain embodiments, a digital television receiver device, has an electrical connector having a non-PCMCIA connector adapted to indirectly connect to a service card through an interface adapter, wherein the interface adapter connects direct to the service card to receive encrypted television signals from the service card. A copy protection circuit decrypts the encrypted television signals received from the interface adapter. A decoder decodes the decrypted television signals for rendering.

In certain embodiments, the receiver device also has a memory and the encrypted television signals are retrieved from memory for delivery to the copy protection circuit. In certain embodiments, the unified memory further stores television signals received from the television receiver device. In certain embodiments, the encrypted television signals are encrypted using one of DFAST, DTCP encryption. In certain embodiments, the electrical connector comprises a USB connector. In certain embodiments, the receiver device has a USB interface circuit. In certain embodiments, the electrical connector comprises a computer bus connector. In certain embodiments, the interface adapter is factory installed in the digital television receiver device. In certain embodiments, a service card is connected to the electrical connector. In certain embodiments, the interface adapter is user installable in the digital television receiver device.

While certain embodiments herein were described in conjunction with specific circuitry that carries out the functions described, and other embodiments are may in which the circuit functions are carried out using equivalent embodiments executed on one or more programmed processors. General purpose computers, microprocessor based computers, microcontrollers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors. Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. An interface adapter device, comprising:
a first electrical connector adapted to connect to a conditional access service card to receive encrypted television signals therefrom;
a second electrical connector adapted to connect to a television receiver device in order to provide the encrypted television signals to the television receiver device, where the television receiver device comprises an in-band tuner for tuning an in-band television signal portion of a radio frequency (RF) signal and an in-band demodulator that converts the tuned in-band television signal portion of the RF signal to a digital in-band television signal that is received from the television receiver device and encrypted by the conditional access service card to create the encrypted television signals;
an interface circuit that receives the encrypted television signals from the first electrical connector and adapts the signals for transmission to the television receiver device over the second electrical connector;
an input for receiving the RF signal;
an out of band tuner for tuning an out of band signal separated from the in-band television signal portion of the RF signal;
an out of band demodulator that converts the out of band signal to a digital out of band signal; and
wherein the digital out of band signal is passed through the first electrical connector to the service card.

2. The device according to claim 1, wherein the encrypted television signals are encrypted using one of DFAST and DTCP encryption.

3. The device according to claim 1, wherein the first electrical connector comprises a PCMCIA connector and wherein the second electrical connector comprises a USB connector.

4. The device according to claim 1, wherein the first electrical connector comprises a PCMCIA connector and wherein the second electrical connector comprises a computer bus connector.

5. The device according to claim 1, wherein the first electrical connector comprises a PCMCIA connector and wherein the second electrical connector comprises a custom connector.

6. The device according to claim 1, wherein the interface circuit comprises a USB interface circuit.

7. The device according to claim 1, wherein the interface circuit comprises a buffer transceiver communicating with the service card, and further comprises a unified memory in communication with the buffer transceiver, whereby the encrypted television signals can be stored on the unified memory for retrieval by the television receiver device.

8. The device according to claim 1, wherein the interface circuit comprises additional mass storage memory that may be used by the television receiver device.

9. The device according to claim 7, further comprising a programmed processor and wherein the buffer transceiver and the unified memory operate under control of the programmed processor.

10. The device according to claim 9, wherein the digital in-band television signal is further received via the second electrical connector from the television receiver device and wherein the unified memory further stores the digital in-band television signal received from the television receiver device.

11. The interface adapter device of claim 10, wherein the interface circuit further sends the digital in-band television signal to the service card via the first electrical connector.

12. The device according to claim 1, wherein the interface circuit comprises a buffer transceiver operating under control of a programmed processor residing within the television receiver device.

13. The device according to claim 1, further comprising:
a diplexer that processes the RF signal and separates the in-band television signal from the out of band signal; and
an RF output cable connector that receives the RF signal from the diplexer and that is adapted to send the RF signal to an RF input cable connector of the television receiver device for tuning of the in-band television signal by the television receiver device.

14. An interface adapter device, comprising:
a first electrical connector adapted to connect to a conditional access service card to receive encrypted television signals therefrom;
a second electrical connector adapted to connect to a television receiver device in order to provide the encrypted television signals to the television receiver device, where the television receiver device comprises an in-band tuner for tuning an in-band television signal portion of a radio frequency (RF) signal and an in-band demodulator that converts the tuned in-band television signal portion of the RF signal to a digital in-band television signal that is received from the television receiver device and encrypted by the conditional access service card to create the encrypted television signals;
an interface circuit that receives the encrypted television signals from the first electrical connector and adapts the signals for transmission to the television receiver device over the second electrical connector, wherein the interface circuit comprises a buffer transceiver communicating with the service card, and further comprises a unified memory in communication with the buffer transceiver, and wherein the encrypted television signals can be stored on the unified memory for retrieval by the television receiver device;
a programmed processor, wherein the buffer transceiver and the unified memory operate under control of the programmed processor;
an input for receiving the RF signal;
an out of band tuner for tuning an out of band signal separated from the in-band television signal portion of the RF signal;
an out of band demodulator that converts the out of band signal to a digital out of band signal; and
wherein the digital out of band signal is passed through the first electrical connector to the service card.

15. The device according to claim 14, wherein the encrypted television signals are encrypted using one of DFAST and DTCP encryption.

16. The device according to claim 14, wherein the first electrical connector comprises a PCMCIA connector and wherein the second electrical connector comprises a USB connector.

17. The device according to claim 14, wherein the first electrical connector comprises a PCMCIA connector and wherein the second electrical connector comprises a computer bus connector.

18. The device according to claim 14, wherein the first electrical connector comprises a PCMCIA connector and wherein the second electrical connector comprises a custom connector.

19. The device according to claim 14, wherein the interface circuit comprises a USB interface circuit.

20. The device according to claim 14, wherein the digital in-band television signal is further received via the second electrical connector from the television receiver device and wherein the unified memory further stores the digital in-band television signal received from the television receiver device.

21. The device of claim 20, wherein the interface circuit further sends the digital in-band television signal to the service card via the first electrical connector.

22. The device according to claim 14, further comprising:
a diplexer that processes the RF signal and separates the in-band television signal from the out of band signal; and
an RF output cable connector that receives the RF signal from the diplexer and that is adapted to send the RF signal to an RF input cable connector of the television receiver device for tuning of the in-band television signal by the television receiver device.

23. An interface adapter device, comprising:
a first electrical connector comprising a PCMCIA connector adapted to connect to a conditional access service card to receive encrypted television signals therefrom, wherein the encrypted television signals are copy protected;
a second electrical connector comprising a USB connector adapted to connect to a television receiver device in order to provide the encrypted television signals to the television receiver device, where the television receiver device comprises an in-band tuner for tuning an in-band television signal portion of a radio frequency (RF) signal and an in-band demodulator that converts the tuned in-band television signal to a digital in-band television signal portion of the RF signal that is received from the television receiver device and encrypted by the conditional access service card to create the encrypted television signals;
an interface circuit that receives the encrypted television signals from the first electrical connector and adapts the signals for transmission to the television receiver device over the second electrical connector, wherein the interface circuit comprises a buffer transceiver communicating with the service card, and further comprises a unified memory in communication with the buffer transceiver, and wherein the encrypted television signals can be stored on the unified memory for retrieval by the television receiver device;
a programmed processor and wherein the buffer transceiver and the unified memory operate under control of the programmed processor;
an input for receiving the RF signal;
an out of band tuner for tuning the out of band signal separated from the in-band television signal portion of the RF signal;
an out of band demodulator that converts the out of band signal to a digital out of band signal; and
wherein the digital out of band signal is passed through the first electrical connector to the service card.

24. The device according to claim 23, wherein the digital in-band television signal is further received via the second electrical connector from the television receiver device and wherein the unified memory further stores the digital in-band television signal received from the television receiver device.

25. The device of claim 24, wherein the interface circuit further sends the digital in-band television signal to the service card via the first electrical connector.

26. The device according to claim 23, further comprising:
a diplexer that processes the RF signal and separates the in-band television signal from the out of band signal; and
an RF output cable connector that receives the RF signal from the diplexer and that is adapted to send the RF signal to an RF input cable connector of the television receiver device for tuning of the in-band television signal by the television receiver device.

27. A digital television receiver device, comprising:
a radio frequency (RF) input cable connector adapted to receive an RF signal from an interface adapter;
an in-band tuner for tuning an in-band television signal from the RF signal;
an in-band demodulator that converts the tuned in-band television signal to a digital in-band television signal;
an electrical connector comprising a non-PCMCIA connector adapted to indirectly connect to a conditional access service card to send the demodulated digital in-band television signal through the interface adapter, wherein the interface adapter connects directly to the service card to receive encrypted television signals from the service card and the interface adapter provides, on behalf of the digital television receiver device, out of band tuning for an out of band portion of the RF signal, out of band demodulation that converts the out of band portion of the RF signal to a digital out of band signal that is processed by the service card, and an RF output cable connector that sends the RF signal to the RF input cable connector;
a copy protection circuit that decrypts the encrypted television signals received from the interface adapter; and
a decoder that decodes the decrypted television signals for rendering.

28. The device according to claim 27, further comprising a unified memory and wherein the encrypted television signals are retrieved from the unified memory for delivery to the copy protection circuit.

29. The device according to claim 28, wherein the unified memory further stores the digital in-band television signal to provide the digital in-band television signal to the conditional access service card through the interface adapter.

30. The device according to claim 27, wherein the encrypted television signals are encrypted using one of DFAST and DTCP encryption.

31. The device according to claim 27, wherein the electrical connector comprises a USB connector.

32. The device according to claim 31, further comprising a USB interface circuit.

33. The device according to claim 27, wherein the electrical connector comprises a computer bus connector.

34. The device according to claim 27, wherein the interface adapter is factory installed in the digital television receiver device.

35. The device according to claim 27, wherein the interface adapter is user installable in the digital television receiver device.

* * * * *